UNITED STATES PATENT OFFICE.

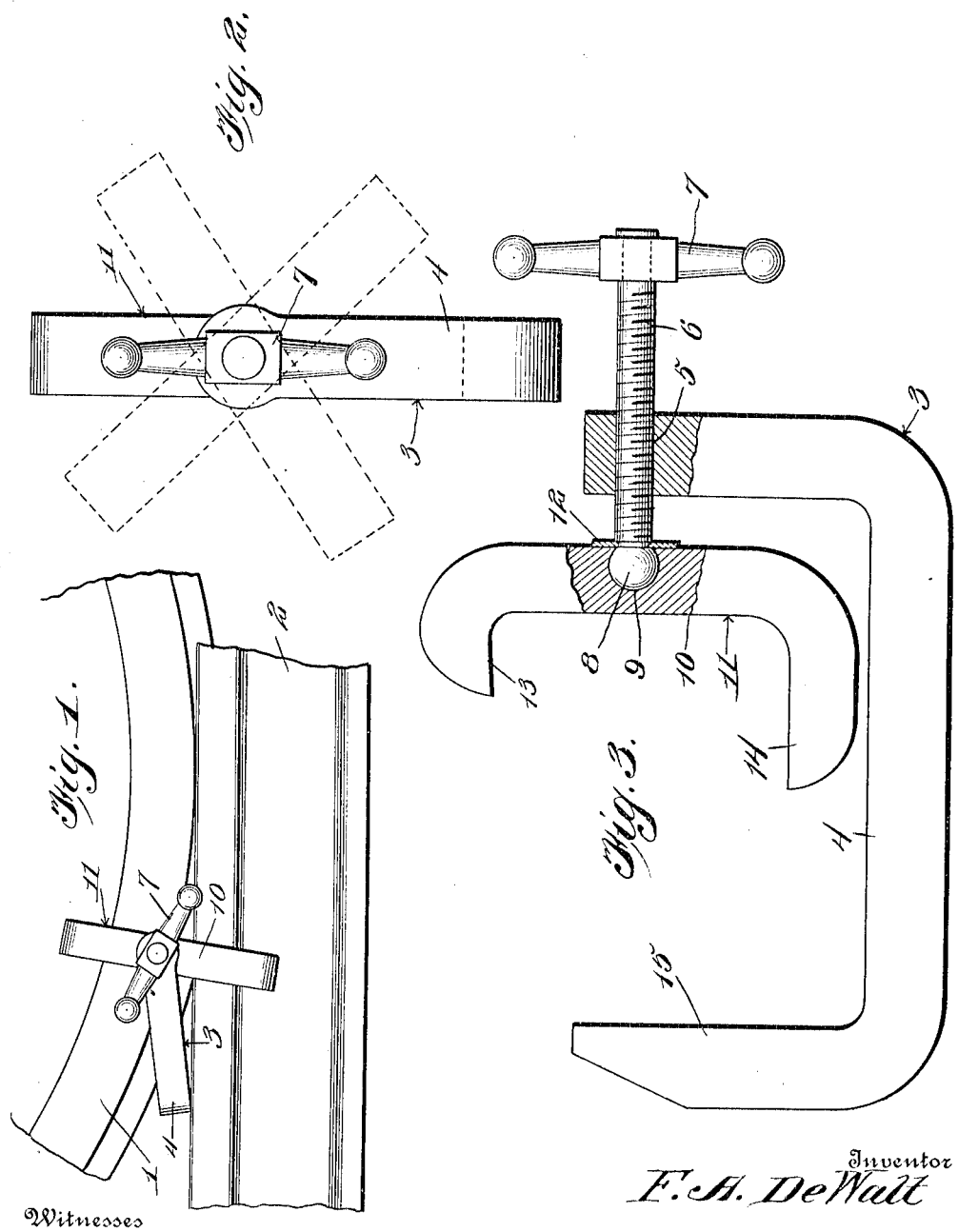

FAY A. DE WALT, OF NEWTON, KANSAS.

WHEEL-CLAMP.

1,090,032.  Specification of Letters Patent.  Patented Mar. 10, 1914.

Application filed January 29, 1913. Serial No. 744,949.

*To all whom it may concern:*

Be it known that I, FAY A. DE WALT, a citizen of the United States, residing at Newton, in the county of Harvey and State of Kansas, have invented new and useful Improvements in Wheel-Clamps, of which the following is a specification.

The present invention relates to wheel clamps.

In carrying out my invention it is my purpose to provide a simple, cheap, but thoroughly effective clamp which is adapted to hold a car wheel to the rail while the box is being jacked to receive a new brass to replace a worn brass.

It may therefore be considered the primary object of my invention to provide a wheel clamp which shall embody the desirable features of simplicity of construction, ease of application and operation, and which will perform the functions for which it is designed with accuracy and with efficiency.

With the above recited objects in view, and others which will appear as the nature of the invention is more fully understood, the improvement resides in the construction and novel combination of parts set forth in the following specification and falling within the scope of the appended claim.

In the drawing: Figure 1 is a view illustrating the clamp in applied position upon a rail and car wheel, Fig. 2 is a front elevation of the clamp, the dotted lines illustrating the various angles to which the hooked ends of the combined wheel rim and rail engaging member may assume, and Fig. 3 is a side elevation of the clamp, parts being shown in section.

Referring now to the drawing in detail, the numeral 1 designates an ordinary flat car wheel, and 2 the track upon which the wheel travels.

The numeral 3 designates my improved clamp. The clamp embodies substantially a U-shaped yoke 4 which has one of its arms provided with a threaded opening 5, through which passes a screw 6. This screw has its outer end provided with a turning member in the nature of a hand wheel 7, and the inner extremity of said screw is provided with a round or ball-head 8 which is received within a rounded cavity or depression 9 provided in the connecting member 10 of a combined wheel rim and rail engaging member 11. The ball-head 8 is retained within its pocket 9 in any desired or preferred manner, as for instance, the plate 12 may be secured to the outer face of the portion 10 of the member 11 and engage with the reduced neck of the ball-head 8 and to connect with the screw 6. The member 11 has both of its ends arranged at an angle to the portion 10, and one of the angular portions 13, being hooked shaped and being adapted to engage with the rim of the wheel 2, while the second angular portion 14, while arranged in a plane parallel with the plane of the hook 13, is preferably of a greater length than the said hook 13, and is adapted to engage beneath the head of the rail 2.

The arm of the member 4, opposite the arm provided with the threaded opening 5, and which may be designated by the numeral 15, is adapted to engage with the inner face of the wheel 2, to effectively prevent the lateral movement of the wheel when the same is to be retained upon the rail 2 and the box of the wheel is jacked for the reception of a new brass. It will be noted that both the members 4 and 11 may be rotated to assume any desired angle, and thus it will be seen that the members 4 and 11 may be adjusted with relation to each other and with relation to the rim of the wheel and to the head of the rail as to permit of the hook being employed upon wheels and rails which vary in size and thicknesses.

Having thus described the invention, what I claim is:

A clamp for locking a car wheel to a rail, including a substantially U-shaped member, a longitudinally adjustable member carried by one of the arms of the said U-shaped member, a clamp swiveled to the adjustable member, said clamp having angular ends, one of said ends providing a hook and the second end being of a greater length than the hook, all substantially as and for the purpose set forth.

In testimony whereof I affix my signature in presence of two witnesses.

FAY A. DE WALT.

Witnesses:
A. E. MORGAN,
CAROLINE BECKER.

Copies of this patent may be obtained for five cents each, by addressing the "Commissioner of Patents, Washington, D. C."